United States Patent [19]
Logan

[11] Patent Number: 5,199,066
[45] Date of Patent: Mar. 30, 1993

[54] METHOD AND APPARATUS FOR PROTECTING SOFTWARE

[75] Inventor: Andrew J. Logan, Gladwyne, Pa.

[73] Assignee: Special Effects Software, Inc., Philadelphia, Pa.

[21] Appl. No.: 339,760

[22] Filed: Apr. 18, 1989

[51] Int. Cl.$^5$ .......................... H04L 9/00; H04L 9/32
[52] U.S. Cl. ............................................ 380/4; 380/23; 380/25; 380/49; 380/50; 340/825.31; 340/825.34
[58] Field of Search ................ 364/200, 900; 380/3, 380/4, 23, 25, 49, 50, 22; 360/60; 340/825.31, 825.34

[56] References Cited

U.S. PATENT DOCUMENTS

| | | | |
|---|---|---|---|
| 4,433,207 | 2/1984 | Best | 380/4 |
| 4,458,315 | 7/1984 | Uchenick | 380/4 |
| 4,471,163 | 9/1984 | Donald et al. | 380/4 |
| 4,558,176 | 12/1985 | Arnold et al. | 380/4 |
| 4,562,306 | 12/1985 | Chou et al. | 380/4 |
| 4,593,353 | 6/1986 | Pickholtz | 364/200 |
| 4,634,807 | 1/1987 | Chorley et al. | 380/4 |
| 4,652,990 | 3/1987 | Pailen et al. | 364/200 |
| 4,658,093 | 4/1987 | Hellman | 380/25 |
| 4,670,857 | 6/1987 | Rackman | 380/4 |
| 4,683,553 | 7/1987 | Mollier | 380/4 |
| 4,683,968 | 8/1987 | Appelbaum et al. | 380/4 |
| 4,685,055 | 8/1987 | Thomas | 364/200 |
| 4,740,890 | 4/1988 | William | 364/200 |
| 4,866,769 | 9/1989 | Karp | 380/4 |
| 4,901,168 | 2/1990 | Yoshida et al. | 360/60 |

*Primary Examiner*—Bernarr E. Gregory
*Attorney, Agent, or Firm*—Woodcock Washburn Kurtz Mackiewicz & Norris

[57] ABSTRACT

A method and system for protecting a software program recorded within a storage medium for use with or transmission to computer or processor based hardware comprises inputting a hardware code uniquely associated with the particular hardware and inputting a first software code uniquely associated with the particular embodiment of the software. A first predetermined operation is performed upon the hardware code and the first software code to produce an intermediate code. A unique activation code obtained from the software supplier is inputted and a second predetermined operation is performed upon the intermediate code and the activation code to produce a second intermediate code. The second intermediate code is compared to a second software code uniquely associated with the particular embodiment of the software and stored in a hidden location within the software. The use of the software is enabled only if the second intermediate code and the second software code are identical.

20 Claims, 2 Drawing Sheets

METHOD AND APPARATUS FOR PROTECTING SOFTWARE

BACKGROUND OF THE INVENTION

The present invention relates to computer software or programs and, more particularly, to a method and system for protecting software programs from unauthorized use and/or copying.

With the tremendous increase in the number of home computers, as well as business computers that are currently in use, there has been a corresponding increase in computer software or programs for use with such home and business computers. For example, specialized applications programs have been developed for everything from presenting elaborate spread sheets and desk top publishing to sophisticated computer games. In general such applications programs are sold to the end user either directly by the individual or company which developed the program, or through an established distribution network which may include mail order and/or retail sales outlets. In many cases, the applications program is stored within a standard magnetic storage medium, such as floppy disk, to facilitate loading of the program into the home or business computer for performing the desired task.

Control of the software, particularly software distributed on a floppy disk, has become a major problem, due to the ease with which a program stored within a floppy disk may be duplicated. Although, in theory, the copyright laws protect software developers from unauthorized copying of such programs, it is impractical, if not impossible, for software developers to fully enforce their copyrights, particularly against companies or individuals making a relatively small number of copies. For example, a small company may purchase one copy of the original software from the developer and may then produce four or five unauthorized copies of the software for separate use on computers at different locations within the company.

Likewise, a group of individuals may combine their money to purchase one original of the software for a particular computer game and then make a number of unauthorized copies for separate use of the software by each of the individuals within the group on their own computers. In either event, the developer of the software is unable to enforce its rights against the copiers since, without having inside information, it is not possible for the software developer to know that the unauthorized copies of the software were made and/or who made the unauthorized copies. Moreover, it would be prohibitively expensive to take legal action to enforce copyrights with respect to such small numbers of unauthorized copies. Accordingly, software developers are generally unable to enforce their rights and, therefore, are suffering economic loss.

Various methods have been developed to prevent the unauthorized copying of software. One such method involves requiring the purchaser of the software to enter into a license agreement which permits use of the software only upon a single designated computer and prohibits the purchaser from making unauthorized copies. This form of protection is difficult and expensive to enforce, particularly when dealing with smaller companies and individuals.

A second form of protection requires utilizing a secret code or password which must be obtained from the software supplier and entered when using the software. While this form of protection has merit, it still does not preclude unauthorized use or copying on a relatively small scale since the code or password can be obtained by one person from the software supplier and can be given to the other users within the company or group.

A third form of protection involves placing restrictions within the computer program which completely preclude copying or permit only a single copy of the program to be made. While this form of protection can be effective, it may prevent a legitimate purchaser of the software from making a single backup copy, as permitted by law. In addition, specialized programs have been developed to circumvent or override this type of protection. Other forms of copy protection have been developed and employed with limited success. In some cases, the other forms of protection are too expensive to employ with some software, and, in other cases, these other forms of protection are not technically suitable for some software.

The present invention overcomes many of the problems inherent in the existing forms of protection for computer software and provides protection from both unauthorized use and copying. With one embodiment of the present invention, the serial number of the particular hardware, as well as the serial number of the particular copy of the software, must be entered, along with a unique activation number obtained from the software supplier, in order to enable use of the software. The software performs an operation upon the hardware serial number, the software serial number and the activation number to produce an intermediate code which is compared to a number hidden within the software and uniquely associated with the particular copy of the software. The program is arranged to automatically change the hidden number in a predetermined manner whenever the software is copied. The software is only operable if the comparison indicates that the intermediate code and the hidden number are identical. In this manner, only a single embodiment of the software can be used with the activation number initially supplied by the software developer. Every time a copy of the software is made, the user must contact the software developer to obtain a new activation number. In this manner, the software developer is able to keep accurate records with respect to the number of copies made and may charge the user accordingly.

SUMMARY OF THE INVENTION

Briefly stated, the present invention comprises a method and system for protecting a software program recorded within a storage medium for use with, or transmission to, computer or processor based hardware. The method comprises inputting a hardware code uniquely associated with the particular hardware with which the software is to be employed and inputting a first software code uniquely associated with the particular embodiment of the software being employed. A first predetermined operation is performed upon the hardware code and the first software code to produce a first intermediate code. A unique activation code for the particular embodiment of the software being employed is inputted, the activation code being received from the software supplier. A second predetermined operation is performed upon the first intermediate code and the activation code to produce a second intermediate code. The second intermediate code is compared with a second software code uniquely associated with the particular embodiment of the software and stored at a hidden location within the software, the second software code not being ascertainable by the user. The software is enabled for use if the second intermediate code and the second software code are identical.

BRIEF DESCRIPTION OF THE DRAWINGS

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed.

In the drawings.

DESCRIPTION OF PREFERRED EMBODIMENT

Figure 1:
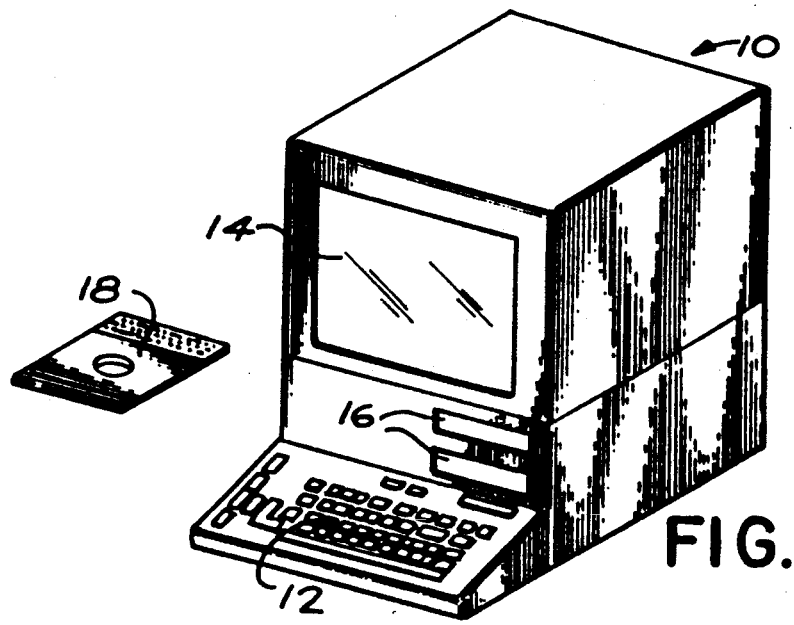
FIG. 1 is a perspective view of a personal computer and a floppy disk, within which is stored a computer program.

Referring to the drawings, wherein like numerals indicate like elements throughout, there is shown in FIG. 1 a typical personal computer 10 of a type well known in the art, and commercially available from a variety of manufacturers, for example, IBM Corporation. The personal computer 10 includes a standard keyboard 12, a standard cathode ray tube (CRT) or screen 14 and a pair of floppy disk drives 16. The keyboard 12 is employed to facilitate communication between an individual user and the computer 10 in a manner which is generally well known in the computer art. The CRT 14 also functions in a manner well known in the computer art for displaying information inputted through the keyboard 12, as well as information outputted by the inner workings of the computer 10. The disk drives 16 are employed in a manner well known in the computer art for receiving one or more floppy disks to facilitate the loading or entry of computer software or programs stored within a floppy disk into the computer 10. A typical floppy disk 18 is illustrated in FIG. 1. As used herein, the terms, "program," "computer program," "software" and "software program" are interchangeably used to mean a series of instructions which are used to control the operation of computer hardware or other computer based or processor based hardware.

While in the present description of a preferred embodiment of the invention, a personal computer 10 is shown and described, it will be appreciated by those skilled in the art that the present invention may be employed in conjunction with any other type of computer, including standard computers such as a mini computer or a main frame computer, and/or special purpose computers. In addition, the present invention may be employed in connection with any other type of computer or processor based hardware such as computer or processor controlled machinery or equipment and any device or network of devices using digital signals or switching.

Likewise, while in connection with the description of the presently preferred embodiment, the computer program or software is illustrated as being stored within a floppy disk 18, it will be appreciated by those skilled in the art that the program or software could alternatively be stored in any other type of storage medium, for example, a different magnetic medium, such as a hard disk magnetic card, magnetic tape, etc.; a semiconductor based storage medium, such as a random access memory (RAM), a read only memory (ROM), a programmable read only memory (PROM), etc.; or a nontraditional storage medium, such as a digital audio or video tape or disk or network of storage devices. Accordingly, it should be clearly understood that the present invention is not limited to the particular computer hardware 10 or storage medium 18 used to illustrate the preferred embodiment of the invention.

Figure 3:
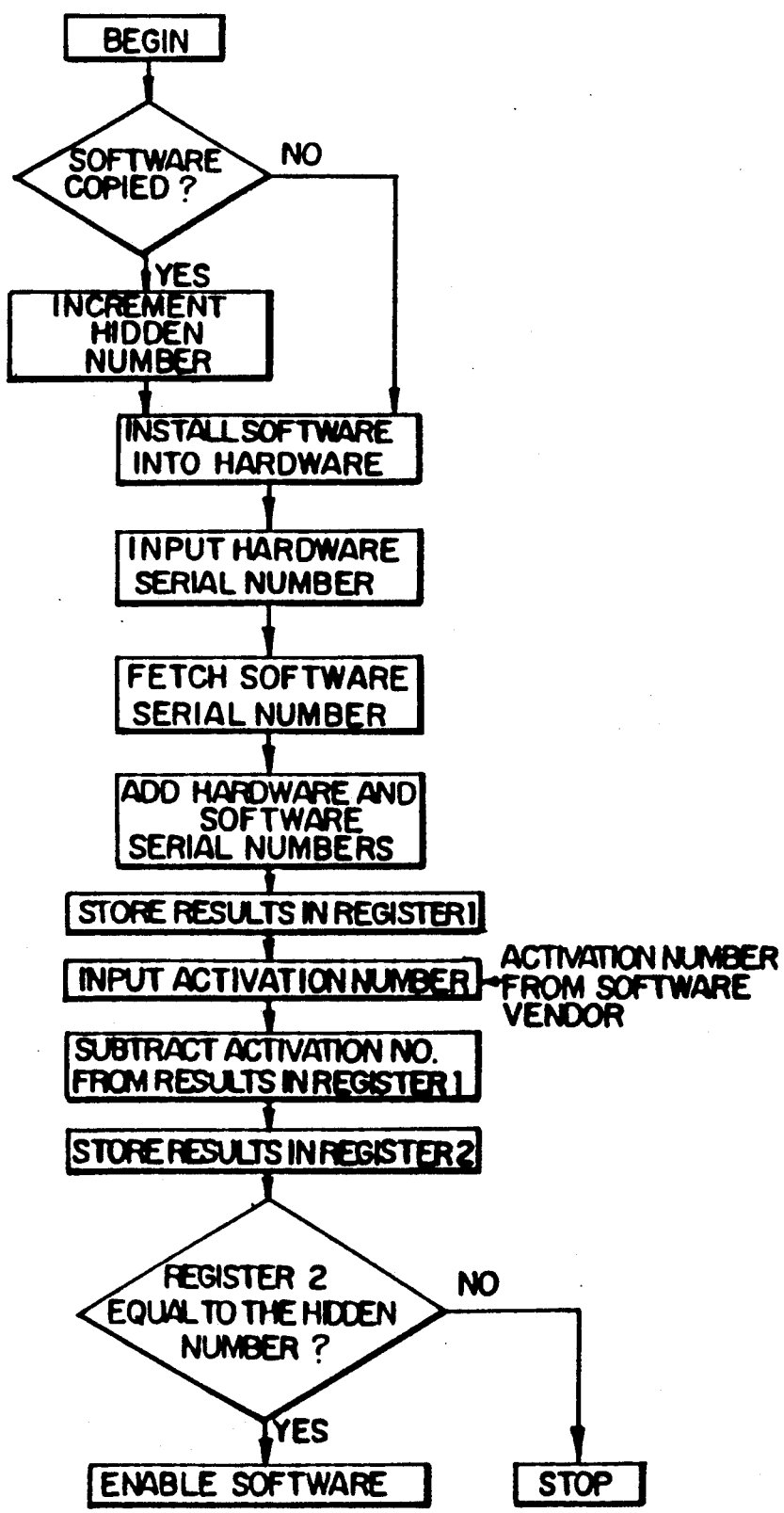
FIG. 3 is a schematic flow diagram of a preferred embodiment of a portion of a computer program which verifies that an activation number received from the software supplier is correct and enables use of the remainder of the computer program.

FIG. 3 shows the operation of the presently preferred embodiment of the invention. Each original copy or embodiment of the computer software has a first software code which is uniquely associated with that one particular embodiment. In the presently preferred embodiment of the invention, the first software code is comprised of the serial number for that particular copy of the software. When the software is stored within a floppy disk 18, the serial number is generally imprinted upon a label or other indicia applied to the upper portion of the floppy disk 18 in a manner well known in the art. In the present embodiment, the first software code or serial number is preferably numeric and is comprised of any number of digits.

Associated with each original copy of the software is a second software code which is stored within the software at a hidden location. The second software code is unique for each original copy of the software and may have a predetermined relationship with the first software code or serial number. In any event, the software supplier is able to identify the second software code for each particular embodiment of the software by reference to the first software code or serial number. As previously indicated, the second software code is hidden within the software at a location which is not identifiable or ascertainable by the software user. In the presently preferred embodiment, the second software code is numeric and may sometimes be referred to as the hidden number. However, it will be appreciated by those skilled in the art that the second software code could be some other specialized code, such as alpha, alphanumeric or digitally coded signal.

The computer program automatically changes or increments the second software code in a predetermined manner each time the software is copied. In the presently preferred embodiment, the numeric second software code or hidden number is incremented by the addition of a predetermined number, such as 7, each time the software is copied. The software user is not made aware of the manner in which the hidden number is changed and cannot ascertain this information. It will be appreciated by those skilled in the art that the second software code could alternatively be changed in some other manner such as by multiplying the code by a predetermined number, or performing any other type of mathematical or logical operation upon the second software code.

When a user wishes to use a program protected by the present invention, the software program is installed into the hardware being employed by the user. Of course, it will be appreciated by those skilled in the art that in some circumstances, such as when employing a hard disk or a fixed storage medium such as an EPROM or the like, the software will already be "installed" into the computer and need only be recalled and transferred from the storage medium into the active memory of the computer. The program then requests that the user input a hardware code uniquely associated with the particular hardware with which the software is to be employed. In the presently preferred embodiment, the hardware code is the numeric serial number of the hardware upon which the program is to operate. However, the hardware code could be something other than the hardware serial number and need not be numeric. The program also requests that the user input the first software code or serial number for the particular software. Of course, it will be appreciated by those skilled in the art that in the case of some computers and some storage media, the program may have the ability to recall or otherwise obtain and input the software serial number and possibly the hardware serial number without any specific action by the user.

The program performs a first predetermined operation upon the hardware code or hardware serial number and the first software code or software serial number to produce a first intermediate code. In the presently preferred embodiment, the first predetermined operation comprises the operation of adding the numeric hardware serial number to the numeric software serial number to produce the first intermediate code which is also numeric. However, it will be appreciated by those skilled in the art that a different mathematical operation, such as multiplication, division, etc. may alternatively be employed. Moreover, since the hardware code and the first software code need not be numeric, some other type of operation or data manipulation may alternatively be employed. In the preferred embodiment, the result of the first predetermined operation or first intermediate code may be stored in a predetermined location or register.

The computer also requests the user to input an activation code received from the software supplier. The activation code is unique for the particular embodiment of the software being employed, as well as for the particular hardware with which the software is employed, and is individually determined or generated by the software supplier in a manner which will hereinafter be described. In the presently preferred embodiment, the activation code is numeric and may be referred to as an activation number. However, it will be appreciated by those skilled in the art that the activation code need not be numeric but could be some other form, such as alpha, alphanumeric or any digitally coded signal.

The program performs a second predetermined operation upon the first intermediate code and the activation code to produce a second intermediate code. In the presently preferred embodiment, the second predetermined operation comprises the operation of addition and the numeric first intermediate code is added to the numeric activation code to provide a second intermediate code which is also numeric. However, it will be appreciated by those skilled in the art that the second predetermined operation may be a mathematical operation other than addition (i.e., multiplication, division, etc.) or may be a non-mathematical operation, such as a logical operation.

In the presently preferred embodiment, the second intermediate code is temporarily stored in a predetermined location, such as a register. The program then compares the second intermediate code with the second software code or hidden number. The comparison may be made in any known manner. If the comparison indicates that the second intermediate code and the second software code are identical, the software is enabled and the user is permitted to operate the software uninhibited. On the other hand, if the comparison indicates that the second intermediate code and the second software code are not identical, the program is halted and the user is prevented from using the software. The user is then required to contact the software supplier and provide the software supplier with information to permit the software supplier to determine or generate a correct activation code. The information which must be provided to the software supplier includes the serial number of the hardware upon which the program is to operate, the serial number of the software and the number of copies of the software which have been made. In this manner, the software supplier may confirm how many copies have been made and upon which different hardware serial numbers the particular program has been operated in the past and can utilize this information to obtain compensation from the software user commensurate with the number of copies and the number of different computers upon which the software is, or has been, operated. Thus, a software purchaser is precluded from using unauthorized software copies and is also precluded from using the software on more than a single computer without compensating the software supplier.

Figure 2:
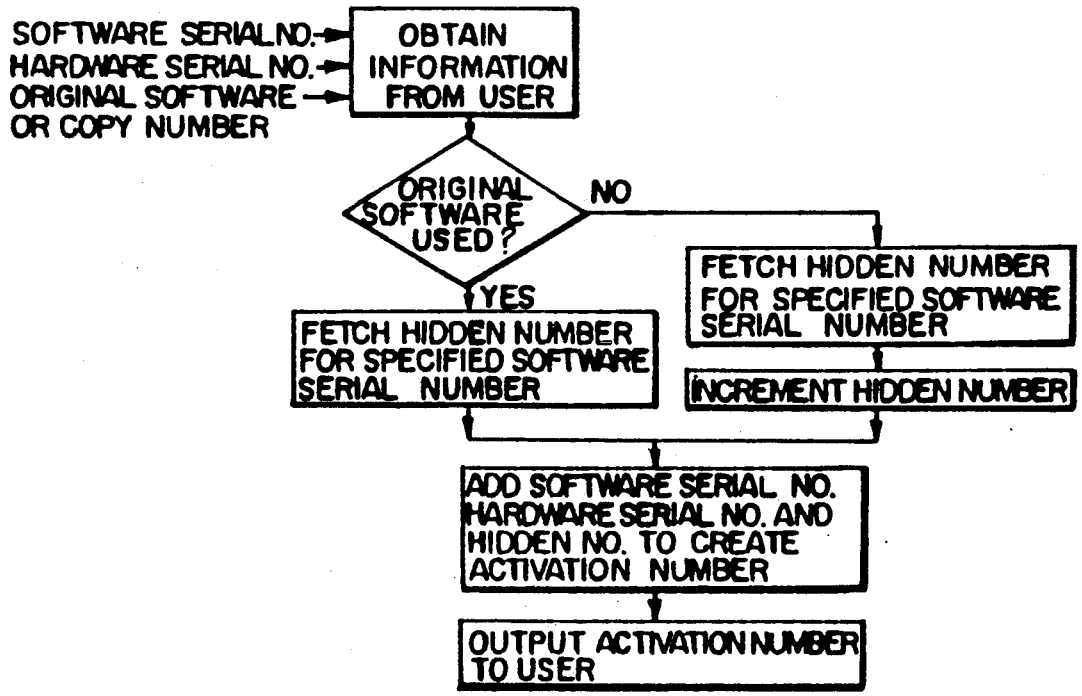
FIG. 2 is a schematic flow diagram which depicts a method for a software supplier to generate an activation code in accordance with a preferred embodiment of the invention.

FIG. 2 illustrates a flow diagram of a preferred method for the software supplier to determine or generate an activation code or activation number to be supplied to the user. The purchaser of the software must contact the software supplier and provide to the software supplier the first software code or software serial number, the hardware code or hardware serial number, as well as whether the original software is to be employed or, if not, the number of times copies have been made and the copy number. The software supplier then accesses its records to obtain the second software code or hidden number uniquely associated with the particular serial number of the software purchased. If the original software is being used and one or more copies of the original software have been made, the second software code is appropriately changed or incremented in the same manner in which the software increments the hidden number so that the software supplier has a second software code which is identical to the then current second software code in the particular embodiment of the software (original or copy) that the user is about to operate. The software supplier then performs the first predetermined operation, in the presently preferred embodiment, addition, upon the software serial number and the hardware serial number to produce a first intermediate code in the same manner in which it would be accomplished by the software. The software supplier then performs a third predetermined operation upon the then current second software code and the first intermediate code to produce the activation code. In general, the third predetermined operation is complementary to the second predetermined operation which is performed by the software. Thus, in the present embodiment, the first intermediate code is subtracted from the second software code to produce the activation code or activation number. The activation code is then provided to the software user to enable use of the software in the manner described above. Preferably, the software supplier will establish a telephone "hot line" to permit software users to conveniently obtain the proper activation code for the software. Preferably, the software supplier will have a computer system available for prompt generation of the activation code upon receiving the necessary information from the user.

From the foregoing description, it can be seen that the present invention comprises a method and apparatus for protecting a software program from unauthorized use or copying. It will be appreciated by those skilled in the art that changes may be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims.

What is claimed is:

1. A method of protecting a software program recorded within a storage medium for use with or transmission to computer or processor based hardware, the method comprising:
   inputting a hardware code uniquely associated with the particular hardware with which the software is to be employed;
   inputting a first software code uniquely associated with the particular embodiment of the software being employed;
   performing a first predetermined operation upon the hardware code and the first software code to produce a first intermediate code;
   inputting a unique activation code for the particular embodiment of the software being employed, the activation code being received from a software supplier;
   performing a second predetermined operation upon the first intermediate code and the activation code to produce a second intermediate code;
   comparing the second intermediate code with a second software code uniquely associated with the particular embodiment of the software being employed and stored at a hidden location within the software, the second software code not being ascertainable by the user; and
   enabling the use of the software if the second intermediate code and the second software code are identical.

2. The method as recited in claim 1 wherein the hardware code is comprised of the serial number for the particular hardware.

3. The method as recited in claim 1 wherein the first software code is comprised of the serial number of the particular software.

4. The method as recited in claim 1 wherein the hardware code and the first software code are numbers and wherein the first predetermined operation comprises a mathematical manipulation of the hardware code and the first software code to produce the first intermediate code, which is also a number.

5. The method as recited in claim 4 wherein the activation code is a number and wherein the second predetermined operation comprises a mathematical manipulation of the first intermediate code and the activation code to produce the second intermediate code, which is also a number.

6. The method as recited in claim 5 wherein both the first and second predetermined operations comprise addition.

7. The method as recited in claim 1 further comprising the step of changing the second software code in a predetermined manner each time the software is copied so that a different activation code is required to enable use of the software.

8. The method as recited in claim 1 wherein the activation code is generated by the software supplier receiving the hardware code and the first software code from the user and performing the first predetermined operation upon the hardware code and the first software code to produce the first intermediate code, the software supplier obtaining the second software code from its records and performing a third predetermined operation upon the second software code and the first intermediate code to produce the activation code, the third predetermined operation being complementary to the second predetermined operation.

9. The method as recited in claim 8 wherein prior to the generation of the activation code the software supplier obtains information from the user regarding the copy status of the software and changes the second software code in a predetermined manner in accordance with the copy status of the software.

10. A method of preventing use of an unauthorized copy of a computer software program recorded within a storage medium for use in computer hardware by preventing the software from operating in the absence of a proper activation code, the method comprising:
    inputting a numeric hardware code uniquely associated with the particular hardware with which the software is to be employed;
    inputting a first numeric software code uniquely associated with the particular software storage medium;
    performing a first predetermined mathematical operation upon the hardware code and the first software code to produce a first numeric intermediate code;
    inputting a numeric activation code received from a software supplier, the activation code being uniquely determined for activation of the software having the particular first software code for use with hardware having the particular hardware code;
    performing a second predetermined mathematic operation upon the first numeric intermediate code and the numeric activation code to produce a second numeric intermediate code;
    comparing the second numeric intermediate code with a second numeric software code uniquely associated with the particular storage medium and stored at a hidden location within the software, the second numeric software code not being ascertainable by the user, the second numeric software code being changed in a predetermined manner each time the software is copied; and
    enabling the use of the software if the second numeric intermediate code and the second numeric software code are identical.

11. The method as recited in claim 10 wherein the hardware code is the hardware serial number.

12. The method as recited in claim 11 wherein the first numeric software code is the software serial number.

13. The method as recited in claim 12 wherein the first and second predetermined mathematical operations comprise addition.

14. A method of generating an activation code for enabling the use of a software program with particular computer or processor based hardware, the method comprising:
- obtaining from the user a hardware code uniquely associated with the particular hardware with which the software is to be employed;
- obtaining from the user a first software code uniquely associated with the particular embodiment of the software being employed;
- performing a predetermined operation upon the hardware code and the first software code to produce a first intermediate code;
- obtaining a second software code uniquely associated with the particular embodiment of the software from stored information corresponding to the first software code; and
- performing a predetermined operation upon the first intermediate code and the second software code to produce the activation code.

15. A system for protecting a software program recorded within a storage medium for use with, or transmission to, computer or processor based hardware, the system comprising:
- means for inputting a hardware code uniquely associated with the particular hardware with which the software is to be employed;
- means for inputting a first software code uniquely associated with the particular embodiment of the software being employed;
- computer means for performing a first predetermined operation upon the hardware code and the first software code to produce a first intermediate code;
- means for inputting a unique activation code for the particular embodiment of the software being employed, the activation code being received from a software supplier;
- computer means for performing a second predetermined operation upon the first intermediate code and the activation code to produce a second intermediate code;
- computer means for comparing the second intermediate code with a second software code uniquely associated with the particular embodiment of the software and stored at a hidden location within the software, the second software code not being ascertainable by the user; and
- means for enabling the use of the software if the second intermediate code and the second software code are identical.

16. The system as recited in claim 15 wherein the hardware code is comprised of the serial number for the particular hardware.

17. The system as recited in claim 15 wherein the first software code is comprised of the serial number of the particular software.

18. The system as recited in claim 15 wherein the hardware code and the first software code are numbers and wherein the first predetermined operation comprises a mathematical manipulation of the hardware code and the first software code to produce the first intermediate code, which is also a number.

19. The system as recited in claim 18 wherein the activation code is a number and wherein the second predetermined operation comprises a mathematical manipulation of the first intermediate code and the activation code to produce the second intermediate code, which is also a number.

20. The system as recited in claim 15 further including means for changing the second software code in a predetermined manner each time the software is copied so that a new activation code is required to enable use of the software.

* * * * *